US008243731B2

(12) United States Patent
Rajan (10) Patent No.: US 8,243,731 B2
(45) Date of Patent: Aug. 14, 2012

(54) APPARATUS AND METHODS FOR CODE-ENHANCED MESSAGING

(75) Inventor: Rajeev D. Rajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 986 days.

(21) Appl. No.: 11/500,615

(22) Filed: Aug. 7, 2006

(65) Prior Publication Data

US 2008/0031251 A1 Feb. 7, 2008

(51) Int. Cl.
*H04L 12/56* (2006.01)
(52) U.S. Cl. .................. 370/392; 370/401; 719/313
(58) Field of Classification Search .................. None
See application file for complete search history.

(56) References Cited

U.S. PATENT DOCUMENTS

| 2002/0049819 | A1* | 4/2002 | Matsuda et al. | 709/206 |
|---|---|---|---|---|
| 2002/0078157 | A1* | 6/2002 | Matsumoto | 709/206 |
| 2002/0114137 | A1 | 8/2002 | Pearson et al. | |
| 2003/0114137 | A1* | 6/2003 | Eiden et al. | 455/403 |

FOREIGN PATENT DOCUMENTS

| EP | 1182834 | 2/2002 |
|---|---|---|
| EP | 1182835 | 2/2002 |
| TW | 580638 B | 3/2004 |
| TW | 580833 B | 3/2004 |
| TW | 580835 B | 3/2004 |
| WO | 9222033 | 12/1992 |
| WO | 9920014 | 4/1999 |

OTHER PUBLICATIONS

Hanckmann J: "Telescript: The emerging standard for intelligent messaging" Philips Telecommunication Review, Philips Telecommunicate Industrie N.V. Hilversum, NL, vol. 52, No. 1, Mar. 1994, pp. 15-19, XP000435511.*
International Search Report—PCT/US07/075031, International Search Authority—European Patent Office—Jan. 14, 2008.
Sakama Y et al: "Agent communications on OCN" NTT Review, Telecommunications Association, Tokyo JP, vol. 9, No. 3, May 1997, pp. 40-48, XP000694464.
Written Opinion—PCT/US07/075031, International Search Authority, European Patent Office, Jan. 14, 2008.
Taiwan Search Report—TW096129121—TIPO—Jul. 1, 2011.

* cited by examiner

*Primary Examiner* — Gregory Sefcheck
*Assistant Examiner* — Salvador E Rivas
(74) *Attorney, Agent, or Firm* — Darren M. Simon (57) ABSTRACT

Apparatus and methods for messaging comprise obtaining a communication message including at least one messaging code, determining an authority-specific action corresponding to each messaging code, and initiating performance of each authority-specific action by execution of a software component. Each authority-specific action may vary depending on a controlling authority associated with the respective software component.

41 Claims, 5 Drawing Sheets

FIG. 6

APPARATUS AND METHODS FOR CODE-ENHANCED MESSAGING

BACKGROUND

The described aspects relate to communications networks, and more particularly, to apparatus and methods for enhancing communications messages exchanged across a communications network.

Communications across networks involve the exchange of communications messages. For example, a communications device operating on a wireless communications network may send and/or receive a voice call message associated with a telephone call, a limited capacity voice service such as the short voice service (SVS™) message developed by Qualcomm, Incorporated of San Diego, Calif., a data call message associated with browsing the Internet, electronic mail and/or a limited capacity data message such as a text message sent via short message service (SMS).

In many instances, such communications messages are limited to data representing a voice message or a text message input into the sending communications device.

Thus, it is desired to enhance the information exchanged by a communications message.

SUMMARY

The present apparatus and methods enhance information exchanged by a communications message.

In some aspects, a method of messaging comprises obtaining, at a first communications device, at least a portion of a communications message sent from a second communications device. The portion of the communications message comprises at least one predetermined messaging code input into the second communications device during generation of the portion of the communications message. Further, the method comprises determining at least one authority-specific action corresponding to the at least one predetermined messaging code. The at least one authority-specific action is operable to be generated at least in part by at least one corresponding software component of the first communications device. Also, the at least one authority-specific action is variable based on a respective controlling authority associated with the respective software component. Additionally, the method comprises performing the at least one authority-specific action.

In a related aspect, at least one processor is configured to perform the above-stated actions. In another related aspect, a machine-readable medium comprises instructions stored thereon including a first set of instructions for performing the above-stated obtaining action, a second set of instructions for performing the above-stated determining action and a third set of instructions for performing the above-stated performing action. In yet another related aspect, an apparatus comprises means for obtaining, means for determining, and means performing each of the above-stated actions.

In other aspects, a communications device comprises a processor and a memory operable to store at least a portion of a messaging module and at least one software component. The communications device further comprises a communications module operable to receive at least a portion of a communications message sent from another communications device. The portion of the communications message comprises at least one predetermined messaging code input into the second communications device during generation of the portion of the communications message. Also, the messaging module is executable by the processor to determine at least one authority-specific action corresponding to the at least one predetermined messaging code. The at least one authority-specific action is operable to be generated at least in part by the at least one software component. Further, the at least one authority-specific action is variable based on a respective controlling authority associated with the respective software component.

In further alternative aspects, a method of messaging comprises generating a communications message comprising at least one predetermined messaging code selected from a plurality of messaging codes each associated with one of a plurality of authority-specific actions. The at least one predetermined messaging code is operable to initiate execution of at least one corresponding software component on a communications device receiving the communications message. The at least one corresponding software component is operable to generate each respective one of the plurality of authority-specific actions associated with the at least one predetermined messaging code. Also, each authority-specific action is variable based on a respective one of a plurality of controlling authorities associated with the respective software component. Additionally, the method comprises transmitting the communications message to another communications device.

In a related aspect, at least one processor is configured to perform the above-stated actions. In another related aspect, a machine-readable medium comprises instructions stored thereon including a first set of instructions for performing the above-stated generating action and a second set of instructions for performing the above-stated transmitting action. In yet another related aspect, an apparatus comprises means for generating and means for transmitting each of the above-stated actions.

In still other aspects, a communications device comprises a processor and a memory comprising a messaging module executable by the processor and operable to generate a communications message comprising at least one predetermined messaging code selected from a plurality of messaging codes each associated with one of a plurality of authority-specific actions. The at least one predetermined messaging code is operable to initiate execution of at least one corresponding software component on a communications device receiving the communications message. Further, the at least one corresponding software component is operable to generate each respective one of the plurality of authority-specific actions associated with the at least one predetermined messaging code. Also, each authority-specific action is variable based on a respective one of a plurality of controlling authorities associated with the respective software component. The communications device further comprises a communications module operable to transmit the communications message to another communications device.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The apparatus and methods described herein provide for the use of messaging codes within communications messages. In some aspects, the messaging codes initiate software components on the receiving device in response to the communications message. Alternatively, or in addition, in other aspects, the messaging codes may initiate software components on the sending device. In either case, the corresponding action performed by the software component, although achieving a known general result, may be customized and differentiated based on a controlling authority associated with the software component. In one non-limiting case, for example, the apparatus and methods advantageously provide additional value to short message service (SMS) or text messages due to the limited payload length associated with such services. For example, standard SMS messages may range from between about 160 characters and 256 characters. As such, in some aspects, the apparatus and methods described herein provide an efficient and compact mechanism for adding additional information and functionality to text messages having limited capacity. The abbreviated, code-based messaging language described herein improves the efficiency in which messages are exchanged, for example, by initiating at least one of a plurality of potential responses to the message on the receiving communication device. Further, the apparatus and methods described herein provide this improved efficiency within the existing messaging framework, without requiring network modifications, thereby providing a simplistic and easily-adopted solution. Thus, the present apparatus and methods operate to enhance communications messaging between two or more devices.

Figure 1:
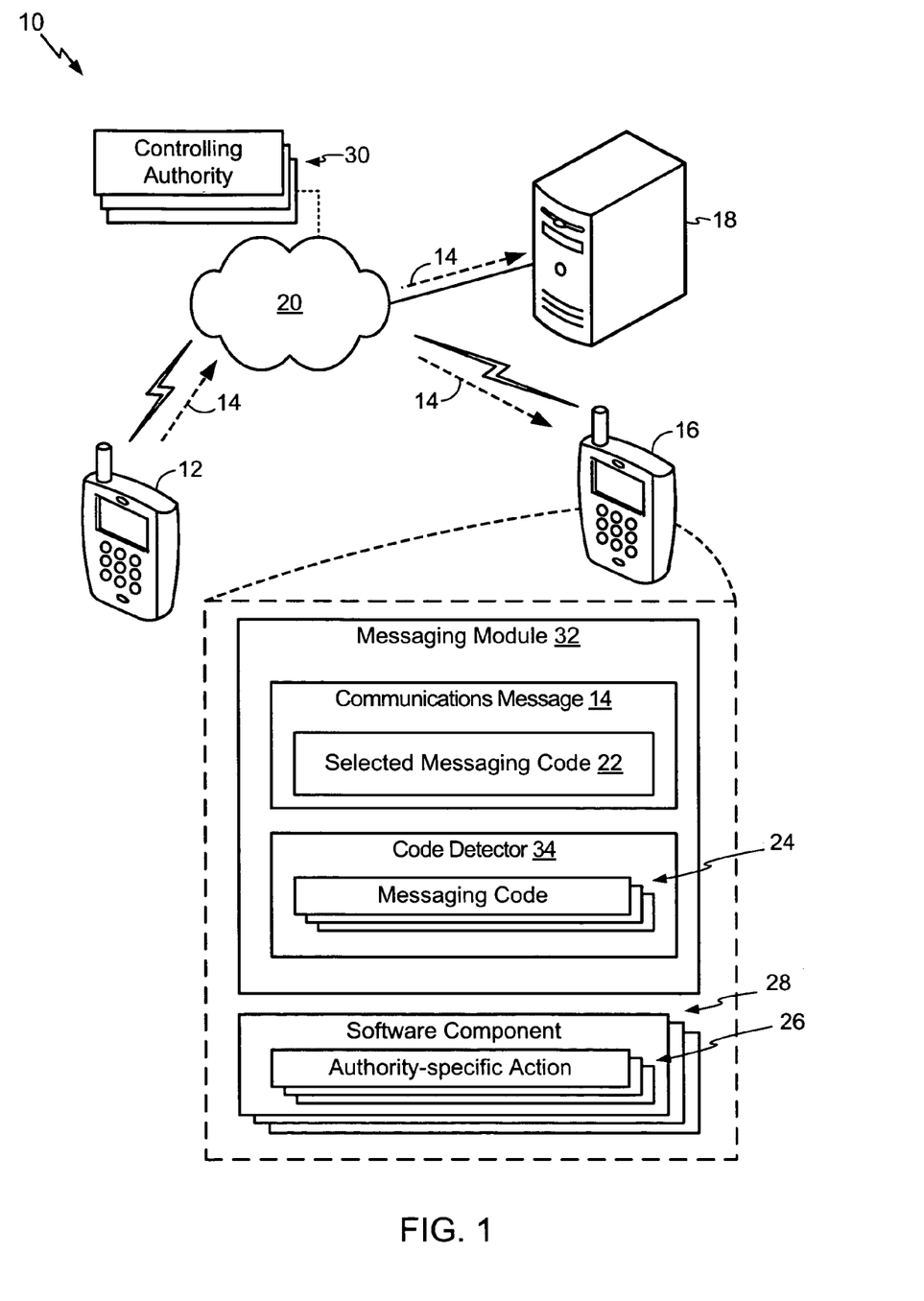
FIG. 1 is a schematic diagram of one aspect of an enhanced messaging system.

Referring to FIG. 1, aspects of an enhanced messaging system 10 comprise a first communications device 12 operable to transmit a communications message 14 to a second communications device 16 and/or 18 across a communications network 20. In some aspects, communications message 14 may include, at least, a messaging code 22 operable to enhance communications message 14. For example, messaging code 22 may be selected from a plurality of predetermined messaging codes 24 by a user of first communications device 12 during generation of communications message 14. Further, in some aspects, the plurality of predetermined messaging codes 24 may be standardized, previously-known codes. Each of the plurality of predetermined messaging codes 24 may be associated with one of a corresponding plurality of authority-specific actions 26. Further, each of the plurality of authority-specific actions 26 may be operable to be generated at least in part by a corresponding one of a plurality of software components 28 on second communications device 16 and/or 18. For example, each of the plurality of authority-specific actions 26 may initiate a predetermined behavior and/or functionality of the corresponding software component. Additionally, each of the plurality of software components 28 may be associated with a controlling authority 30, which is an entity that dictates the behavior and/or functionality of the corresponding authority-specific action. As such, each of the plurality of authority-specific actions 26 may vary depending on the corresponding one of a plurality of controlling authorities 30 associated with the respective software component.

Second communication device 16 and/or 18 comprises a messaging module 32 operable to receive, at least in part, communications message 14. Messaging module 32 includes a code detector 34 operable to identify the selected messaging code 22 included in communications message 14. Further, code detector 34 is operable to determine the corresponding one of the plurality of authority-specific actions 26 and initiate operation of the corresponding authority-specific action by execution of the respective one of the plurality of software components 28 on second communication device 16 and/or 18.

In some aspects, for example, each of the plurality of authority-specific actions 26 may be operable to automate, at least partially, a reply communications message sent back to first communication device 12 based on messaging code 22 and/or a payload of communications message 14, as is discussed below in more detail. In other aspects, each of the plurality of authority-specific actions 26 may be operable to automate, at least partially, an operation occurring solely on second communications device 16 and/or 18, and/or between second communications device 16 and/or 18 and another communication device.

Further, it should be noted that, in some aspects, the authority-specific action corresponding to messaging code 22 may be carried out only after receiving an approval input by a user of second communication device 16 and/or 18. In other aspects, however, the authority-specific action may not require user approval, and thus may be carried out automatically.

Additionally or in the alternative, in some aspects, messaging code 22 may operate to initiate a corresponding one of a plurality of authority-specific actions on the sending device, i.e. first communication device 12. In the same manner as discussed above, the authority-specific action is executed by a respective one of a plurality of software components on first communications device 12, and such action may vary depending on the one of the plurality of controlling authorities 30 associated with the respective software component.

In one non-limiting case, for example, first communication device 12 may send communication message 14 to second communication device 16 and/or 16 with messaging code 22 representing a lunch invitation and including a payload indicating the proposed meeting time and/or place. Upon receiving communication message 14, messaging module 32 of second communication device 16 and/or 18 executes code detector 34 which identifies messaging code 22 and associates it with one of the plurality of authority-specific actions 26 relating to responding to a meeting invitation. Further, the respective authority-specific action 26 is further associated with one of the plurality of software components 28 corresponding to one of the plurality of controlling authorities 30. In this example, controlling authorities 30 may include competing software developers, and the developer for the respective software component on device 16 and/or 18 has differentiated their product by directing the respective authority-specific action to automatically generate a pop-up window with "yes," "no," and "edit," selections in response to receiving communication message 14. In this example, the user of device 16 and/or 18 can select "yes" to accept the invitation, "no" to decline the invitation, or "edit" to suggest a change to the proposed time and/or place. Further, the developer in this case has differentiated the respective software component by programming it, upon receipt of a "yes" or "edit" input, to automatically establish a calendar entry and a reminder in an associated calendaring software component on device 16 and/or 18. Additionally, or in the alternative, upon sending communication message 14, a messaging module on first communication device 12 comparable to module 32 may operate to detect messaging code 22, and reference and execute a corresponding authority-specific action. In this case, the respective controlling authority associated with the respective software component operable to carry out the action on first communication device 12 may have differentiated their product by programming an operation to automatically set a timer to wait a predetermined and/or selectable amount of time to receive a reply message from second communication device 16 and/or 18. In this example, upon the expiry of the timer, the respective controlling authority associated with the respective software component may have differentiated their product by programming an operation to generate a reminder that allows the user the option to resend the invitation or wait another predetermined and/or selectable amount of time. It should be understood that this is but one of a plurality of possible use cases for the present system 10.

Thus, system 10 provides apparatus and methods for enhancing the content of communications message 14 by including messaging code 22, input by the sending user, operable to initiate one of a plurality of authority-specific actions 26. In some aspects, the respective action is initiated on the receiving communications device, such as second communication device 16 and/or 18. Alternatively, or in addition, in other aspects another authority-specific action may be initiated on the sending device, i.e. first communication device 12, upon transmitting communication message 14. Further, the behavior and/or functionality associated with the corresponding authority-specific action may vary from one communication device to another communication device, depending on the corresponding one of the plurality of controlling authorities 30 associated with the respective communication device or associated with the one of the plurality of software components 28 operable to carry out the respective authority-specific action. Therefore, system 10 adds value to the user experience in exchanging communications messages by automatically initiating behavior and/or functionality responsive to the communications message based on the respective messaging code, and further provides service differentiation by enabling a variation in the initiated behavior and/or functionality based on the associated controlling authority.

According to some aspects, first communication device 12 and second communication device 16 and/or 18 may comprise any type of computerized, communication device. For example, as illustrated in FIG. 1, first communication device 12 and second communication device 16 may comprise a mobile communication device, such as a wireless and/or cellular telephone, while second communication device 18 may comprises a fixed communication device, such as a network device, a server, a computer workstation, etc. It should be understood that communication devices 12, 16 and/or 18 are not limited to the illustrated devices, but may further include a Personal Digital Assistant (PDA), a two-way text pager, a portable computer having a wired or wireless communication portal, and any type of computer platform having a wired and/or wireless communications portal. Further, second communication device 16 and/or 18 can be a remote-slave or other similar device, such as remote sensors, remote servers, diagnostic tools, data relays, and the like, which does not have an end-user thereof, but which simply communicates data across a wireless or wired network. In alternate aspects, first communication device 12 and/or second communication device 16 and/or 18 may be a wired communication device, such as a landline telephone, personal computer, set-top box or the like. Additionally, it should be noted that any combination of any number of first communication device 12 and/or second communication device 16 and/or 18 may be utilized in system 10. Therefore, the present apparatus and methods can accordingly be performed on any form of wired or wireless device or computer module, including a wired or wireless communication portal, including without limitation, wireless modems, PCMCIA cards, access terminals, personal computers, telephones, or any combination or sub-combination thereof.

Figure 2:
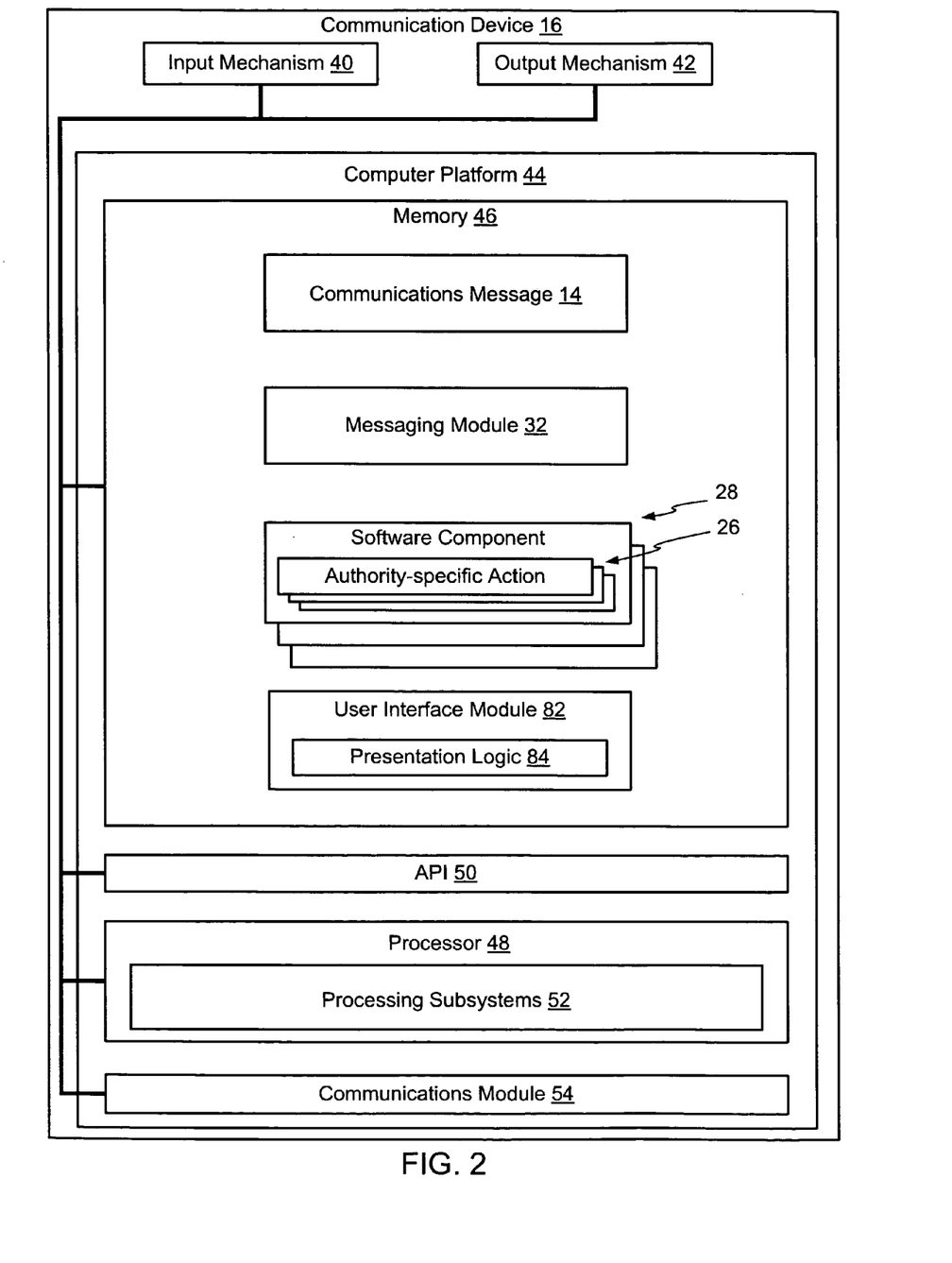
FIG. 2 is a schematic diagram of one aspect of components of a communication device of the system of FIG. 1.

Additionally, referring to FIG. 2 (which, for simplicity, references second communication device 16), first communication device 12 and/or second communication device 16 and/or 18 may include an input mechanism 40 operable to generate or receive an input into the device, and an output mechanism 42 operable to generate and/or present information for consumption by the user of the device. For example, input mechanism 40 may include at least one mechanism such as a keypad and/or keyboard, a mouse, a touch-screen display, a microphone in association with a voice recognition module, etc. In certain aspects, input mechanism 40 may provide for user input of at least a portion of communications message 14 (FIG. 1), including the respective messaging code 22. Further, for example, output mechanism 42 may include a display, an audio speaker, a haptic feedback mechanism, etc. Output mechanism 42 may generate a graphical user interface, a sound, a feeling such as a vibration, etc., and such outputs may be associated, for example, with the transmission and/or receipt of communications message 14.

Further, communication device 16 (and/or 12 and/or 18) may include a computer platform 44 operable to execute applications to provide functionality to the device, and which may further interact with input mechanism 40 and output mechanism 42. Computer platform 44 may include a memory 46, which may comprise volatile and nonvolatile memory portions, such as read-only and/or random-access memory (RAM and ROM), erasable programmable read-only memory (EPROM), electrically erasable programmable read-only memory (EEPROM), flash memory, and/or any memory common to computer platforms. Further, memory 46 may include active memory and storage memory, including an electronic file system and any secondary and/or tertiary storage device, such as magnetic media, optical media, tape, soft and/or hard disk, and removable memory components.

Further, computer platform 44 may also include a processor 48, which may be an application-specific integrated circuit (ASIC), or other chipset, processor, logic circuit, or other data processing device. In some aspects, such as when communication device 16 comprises a cellular telephone, processor 48 or other processor such as ASIC may execute an application programming interface (API) layer 50 that interfaces with any resident software components 28, such as voice call, data call, and media-related applications and messaging module 32, in memory 46. API 50 may be a runtime environment executing on the respective communication device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Additionally, processor 48 may include various processing subsystems 52 embodied in hardware, firmware, software, and combinations thereof, that enable the functionality of communication device 16 (and/or 12 and/or 18) and the operability of the communication device on communications network 20 (FIG. 1). For example, processing subsystems 52 allow for initiating and maintaining communications, and exchanging data, with other networked devices as well as within and/or among components of communication device 16 (and/or 12 and/or 18). In one aspect, such as in a cellular telephone, processor 48 may include one or a combination of processing subsystems 52, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM (universal subscriber identity module/subscriber identity module), voice services, graphics, USB (universal serial bus), multimedia such as MPEG (Moving Picture Experts Group) protocol multimedia, GPRS (General Packet Radio Service), short message service (SMS), short voice service (SVS™), web browser, etc. For the disclosed aspects, processing subsystems 52 of processor 48 may include any subsystem components that interact with applications executing on computer platform 44.

Computer platform 44 may further include a communications module 54 which enables communications among the various components of communication device 16 (and/or 12 and/or 18), as well as being operable to exchange communications message 14 between the device and communications network 20 (FIG. 1). Communications module 54 may be embodied in hardware, firmware, software and/or combinations thereof, and may further include all protocols for use in intra-device and inter-device communications. Further, communications module 54 is operable to transmit and/or receive information, such as communications message 14, in accordance with the apparatus and methods described herein.

Figure 3:
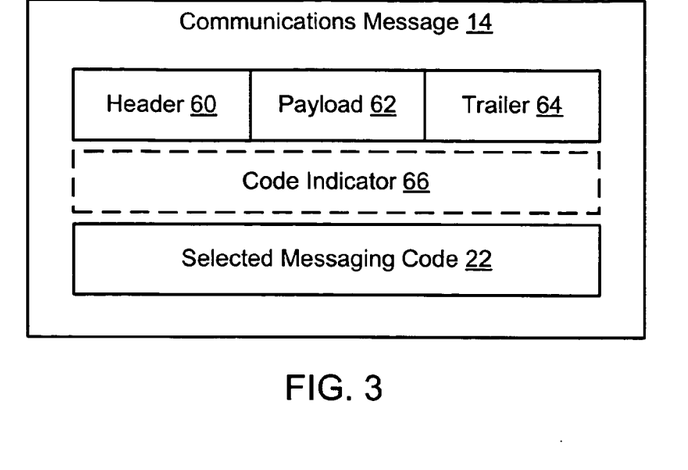
FIG. 3 is a schematic diagram of one aspect of components of a communications message exchanged in the system of FIG. 1.

Additionally, referring to FIGS. 2 and 3, memory 46 may be operable to store all or at least a portion of communications message 14. Communications message 14 may be based on any type of call or communication exchange, including, but not limited to, one or any combination of a voice call, a data call, a limited capacity call having a maximum allowable payload such as a short message service (SMS) call or text message and/or a short voice service (SVS™) call or voice message, and a multimedia message. Further, communication message 14 may be based on any type of communication protocol and/or technology (see list below with respect to communication network 20). In some aspects, communications message 14 may include a header 60, a payload 62, a trailer 64 and at least one selected messaging code 22. It should be noted that communications message 14 may comprise a plurality of messaging codes 22. Header 60 may mark the beginning of the data packet that comprises communications message 14, and may further provide protocol information identifying the type of message, i.e. voice, data, etc., origination address information, destination address information, synchronization information, and sequence information. Payload 62 comprises the body or data transported by communications message 14, which may include, for example, the data bytes representing voice in a voice call or representing text in a data call. Trailer 64 may mark the end of communications message 14, and may further include error checking information.

One or more selected messaging codes 22 may comprise, and/or may be appended to, any portion of communications message 14. For example, in some aspects selected messaging code 22 may comprise or may be appended to header 60, such as the destination phone number or a code appended to the destination phone number, which may be converted into destination address information, such as an Internet Protocol (IP) address or a subscriber identification (SID) number. In other aspects, for example, selected messaging code 22 may comprise or may be input along with payload 62, which may be any type of characters such as alphabetic, numerical, and/or or symbol characters, e.g. the "message" portion of a text message. Similarly, in other aspects, for example, selected messaging code 22 may comprise or may be input along with trailer 64. Selected messaging code 22 may be originally input into the sending communication device as alphabetic and/or numerical characters, symbols, etc.

Additionally, in some optional aspects, communications message 14 may further comprise one or more code indicators 66 operable to indicate the presence of a corresponding one or more selected messaging codes 22 within communications message 14. For example, code indicator 66 may be originally input into the respective communication device as alphabetic and/or numerical characters, symbols, etc.

As noted above, selected messaging code 22 may be chosen from a plurality of messaging codes 24 (FIG. 1), which in some aspects may be a standardized set of codes which define a messaging code language. For example, in some aspects, the vocabulary of the messaging code language may comprise a predetermined number of characters, i.e. the messaging code, and in some aspects may optionally include one or more code indicators 66 at any one or more positions before, after or within the messaging code. In one non-limiting case, for example, the standard messaging code vocabulary may have a format including a maximum of 5 characters, such as in the format +NNNN, where: "+" comprises code indicator 66, where "NNNN" comprises the selected messaging code 22, and where N denotes a single letter of the alphabet from A to Z. It should be noted that this is but one of many potential schemes for the plurality of messaging codes 24 and code indicator 66.

In other aspects, the messaging code language may be extensible such that any number of characters may be used for the messaging code. In some optional aspects, one or some combination of code indicators 66 may signal one or any combination of the presence of a messaging code, the beginning of the messaging code, and the end of the messaging code, where different code indicators 66 may identify the presence, beginning and/or end of the messaging code. In one non-limiting case, for example, the extensible messaging code language may have a format such as +(M), where "+" comprises a first type of code indicator 66 identifying the existence of one of the plurality of messaging codes 24, where "(" comprises a second type of code indicator 66 identifying the beginning of the messaging code, where "M" comprise any number of alphabetic, numeric, and/or symbolic characters comprising the messaging code, and where ")" comprises a third type of code indicator 66 identifying the end of the messaging code.

Further, depending on the given communication protocol, selected messaging code 22 and/or code indicator 66 may be re-formatted or converted into other data, such as a binary code, representative of the originally-entered selected messaging code 22 and/or code indicator 66 as part of the generation of communications message 14.

Figure 4:
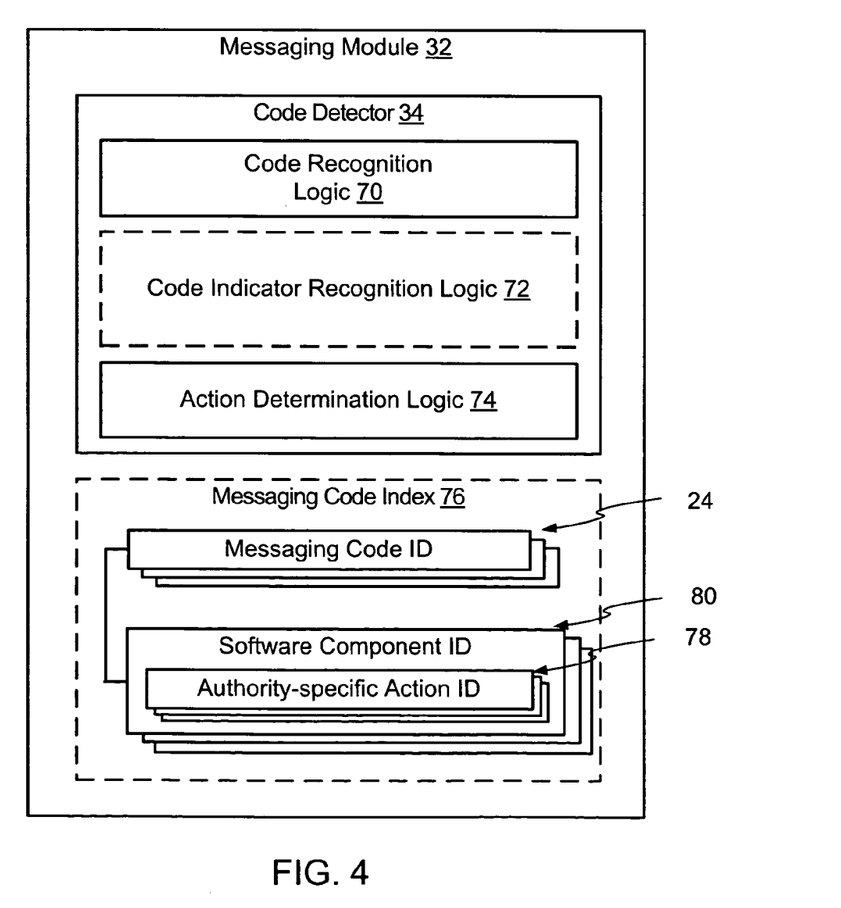
FIG. 4 is a schematic diagram of one aspect of components of a messaging module portion of a communication device of FIGS. 1 and 2.

Additionally, referring to FIGS. 2 and 4, messaging module 32 may be stored in and executed from memory 46. Messaging module 32 may comprise one or any combination of hardware, software, firmware, data and executable instructions operable to provide the respective communication device 16 (and/or 12 and/or 18) with the ability to exchange communications messages 14 with other devices on communications network 20 (FIG. 1). For example, messaging module 32 may be operable to initiate and/or perform one or any combination of originating, transmitting, receiving, processing, and/or displaying or presenting the payload of communications message 14. Further, messaging module 32 may be operable to enable the generation and transmission and/or receipt and presentation of any type of communications message 14. For example, messaging module 32 may support any message and/or call type including, but not limited to, one or any combination of a voice call, a data call, a limited capacity call having a maximum allowable payload such as a short message service call or text message and/or a short voice service call or voice message, and a multimedia message.

As noted above, messaging module 32 is operable to execute code detector 34. Code detector 34 may comprise one or any combination of hardware, software, firmware, data and executable instructions operable to access and parse communications message 14 to detect selected messaging code 22. Further, code detector 34 may be operable to access a database of the plurality of predetermined messaging codes 24 in order to verify that selected messaging code 22 matches with one of the plurality of messaging codes 24, which are associated with one of the plurality of authority-specific actions 26. In some aspects, for example, code detector 34 may comprise code recognition logic 70 operable to parse communications message 14 and identify one or more selected messaging codes 22. Optionally, in some aspects, code detector 34 may further include code indicator recognition logic 72 operable to parse communications message 14 and identify one or more code indicators 66 (FIG. 3). Further, in some aspects, code detector 34 may include action determination logic 74 operable to recognize a meaning of the one or more selected messaging codes 22 and identify a corresponding one or more of the plurality of authority-specific actions 26 to be initiated based on receipt of the respective messaging code 22.

For example, in some aspects, code detector 34 may access a messaging code index 76 which cross-references each of the plurality of messaging codes 24 with a respective one of a plurality of authority-specific action identifiers (IDs) 78, which are further referenced to a respective one of a plurality of software component identifiers (IDs) 80. In turn, each of the plurality of authority-specific action IDs 78 corresponds to one of the plurality of authority-specific actions 26. Similarly, in turn, each of the plurality of software component IDs 80 corresponds to a respective one of the plurality of software components 28.

Thus, based on parsing communications message 14, code detector 34 is operable to identify one or more selected messaging codes 22, determine their meaning and corresponding one or more of the plurality of authority-specific actions 26, and initiate execution of the corresponding one or more software components 28 to carry-out the respective authority-specific action.

Referring to FIG. 2, in some aspects, memory 46 may further store user interface module 82 operable to allow the device user to interface with messaging module 32, any of the plurality of software components 28, and any other component of the respective communication device 16 (and/or 12 and/or 18) generating a user output and/or requiring a user input. User interface module 82 may comprise one or any combination of hardware, software, firmware, data and executable instructions operable to perform these functions. For example, in some aspects, user interface module 82 may comprise presentation logic 84 operable to interface between output mechanism 42 and messaging module 32 and/or any of the plurality of software components 28 in order to present outputs, such as a graphical menu, a sound, payload 62 of communications message 14, etc., to the user of the respective device, and in order to prompt the user to enter inputs, such as selected messaging code 22, code indicator 66, user approvals, etc. Further, for example, in generation of communications message 14, user interface module 82 may operate to provide the user with a menu or list of the plurality of messaging codes 24, as well as their meanings and general corresponding actions, to facilitate their use in the communication exchange.

Additionally, memory 46 may be operable to store one or any combination of the plurality of software components 28. The plurality of software components 28 may comprise various applications operable to provide any functionality to the respective communication device 16 (and/or 12 and/or 18). For example, the plurality of software components 28 may include, but are not limited to, one or more of any combination of applications such as: a user interface application; a communications-related application, such as a voice call application, a short voice service application, a data call application such as a web browser, e-mail, SMS or text messaging, a group communication or push-to-talk application, instant messaging; a position/location application, including one or any combination of a satellite-based and network-based system such as a Global Positioning System (GPS) application, an assisted GPS (A-GPS) system such as the gpsOne® solution from Qualcomm, Incorporated of San Diego, Calif., and a mobile assisted or hybrid mobile-assisted A-GPS application; a media-related application such as a photograph application, a video application such as video players and/or multicast, broadcast, and/or unicast applications, including the MediaFLO™ solution available from Qualcomm, Incorporated of San Diego, Calif.; information serving applications; content serving applications; personal information management applications such as a contact list, a calendar, an appointment list, a task list; gaming applications; emergency-related applications; applets; and any other application operable on a communication device and/or a network device.

Each of the plurality of software components 28 may be under the control of at least one of the plurality of controlling authorities 30 (FIG. 1). The plurality of controlling authorities 30 (FIG. 1) may include, but are not limited to, any combination of a network carrier associated with providing communication services to the respective communication device 16 (and/or 12 and/or 18), a content provider, a content retailer, a developer of the respective software component, a manufacturer of the respective communication device, a manufacturer of a component (such as the processor) of the respective communication device, a government having authority in the region within which the respective communication device operates, and the user of the respective communication device.

The plurality of authority-specific actions 26 may correspond to a respective one of a plurality of behaviors and/or functionalities of any single one or any combination of the plurality of software components 28. In some aspects, for example, at least one of the plurality of authority-specific actions 26 comprises initiating a response from second communications device 16 and/or 18 to first communication device 12 based on the receipt of communications message 14. Further, the appropriate one or more authority-specific actions, i.e. the response, is determined based on the one or more messaging codes 22 in communications message 14, and may vary depending on some other component of communications message 14, such as header 60, payload 62, trailer 64 and/or code indicator 66. For example, in one non-limiting case, selected messaging code 22 may denote the corresponding one of the plurality of authority-specific actions 26, i.e. the response, while payload 62 may define a parameter and/or input data associated with carrying out the respective action. In some aspects, the operation of the respective authority-specific action may be directed to the device originating communications message 14, while in other aspects the operation may be directed to another communication device and/or the action may occur only with respect to some component of the receiving communication device.

Further, since the corresponding one of the plurality of software components 28 is controlled by one of the plurality of controlling authorities 30, different controlling authorities may define different actions 26 to correspond to the same one of the plurality of messaging codes 24 (FIG. 1). Each messaging code 24 is associated with a general meaning, and hence a general type of corresponding authority-specific action. The exact implementation and the details of each action, however, have a degree of allowable variability and thus may be customized within each respective software component by the associated controlling authority. In one non-limiting case, for example, text messaging software from a first vendor may automatically initiate a voice call to the originator of the text message when receiving a messaging code meaning "emergency," while text messaging software from a second vendor, upon receiving the same messaging code, may automatically initiate a text message, which forwards the received text message, to one or more other destinations identified by a "friends network," such as may be indicated in a personal information manager to denote groups of contacts who know each other. As such, the respective one of the plurality of authority-specific actions 26 may be customized by each respective one of the plurality of controlling authorities 30, thereby providing different responses on communication devices having software components associated with different controlling authorities.

Thus, in some aspects of system 10, a messaging code language may be provided that utilizes a known plurality of messaging codes 24 having known meanings and each corresponding, generally, to a known one of a plurality of actions 26, which may be customized from one software component to another software component by an associated one of a plurality of controlling authorities 30. For example, the plurality of messaging codes 24 and their meanings may be published in the public domain, and the action they initiate may be generally known, although the exact implementation of the given action may vary depending on the controlling authority associated with the given software component on the receiving communication device.

Referring to Table 1, in one non-limiting case, an example is given for at least a portion of a standardized messaging code language, the meaning of the respective messaging code, and an example of a corresponding authority-specific action. The standardized messaging code language may include the Wireless Messaging Code Language™ technology and/or the Communications Messaging Code Language™ technology developed by Qualcomm, Incorporated of San Diego, Calif. It should be understood that many other possible messaging code languages, meanings and/or corresponding actions may be utilized.

TABLE 1

Sample Messaging Code Language and Corresponding Actions

| Code Indicator and Messaging Code | Meaning | Action |
|---|---|---|
| +9911 | National Emergency | Forward text message to everyone in speed-dial list |
| +NATE | National Emergency | Forward text message to everyone in speed-dial list |
| +911 | Personal Emergency | Forward text message to everyone in speed-dial list |
| +HELP | In Trouble | Generate loud alert to prompt the user to answer the call or to call back urgently |
| +411 | Directory Assistance | Provide directory assistance based on payload, i.e. data in text |
| +SPOS | Send my position | Send my GPS position coordinates |
| +GPOS | Get my position | Get my GPS position coordinates |
| +GAME | Play a game? | Send a response back Yes/No |
| +BCAST | Broadcast text message | Send out a broadcast to a specific list of people |
| +MCAST | Multicast text message | Send out multicast to a specific list of people |
| +PING | Are you there? | Call back in reply (optionally, after receiving a confirmation) or generate a reminder to call back later or generate a "call you back later" message or do nothing |
| +PCM | Please call me | Call back in reply (optionally, after receiving a confirmation) or generate a reminder to call back later or generate a "call you back later" message or do nothing |
| +PTM | Please text me | Text message in reply (optionally, after receiving a confirmation) or generate a reminder to call back later or generate a "call you back later" message or do nothing |
| +LNCH | Lunch? | Call back in reply (optionally, after receiving a confirmation) or generate a reminder to call back later or automatically reply with a selected yes or no, or do nothing |
| +BLOG | A blog message | Automatic add to a blog identified in the payload of the message |
| +COST | Get me the cost or price | Return the price for the item contained in the text message |
| +COUP | Get me a coupon | Return a coupon to the sender for the item identified in the payload |
| +CONT | Get me some content | Return some content to the sender for the item identified in the payload |
| +PNGM | Ping me whenever or at said time in payload | Call back or add call back to reminder list at time denoted in payload |
| +APPT | Appointment | Automatically add payload data to calendar, reminder, and/or appointment list |
| +IMME | IM (instant message) me | Initiate IM to originator |
| +BRWS | Browse hyperlink | Browser on handset automatically launches to site denoted in payload |
| +NEWS | Some news | Fetch news, such as by launching browser, and show news to user; may be based on data in payload |
| +RMDR | Reminder | Call back in reply (optionally, after receiving a confirmation) or generate a reminder based on payload data or generate a "call you back later" message or do nothing |
| +MUSC | Get me some music | Return some music content to the sender based on the data contained in the payload |
| +MISU | Miss You! | Launch an application conveying sentiment, may include any one or any combination of graphics, video, audio, etc. |
| +LUVU | Love You! | Launch an application conveying sentiment (see above) |

TABLE 1-continued

Sample Messaging Code Language and Corresponding Actions

| Code Indicator and Messaging Code | Meaning | Action |
|---|---|---|
| +TOYU | Thinking of You! | Launch an application conveying sentiment (see above) |
| +ATB | All the best! | Launch an application conveying sentiment (see above) |
| +SFLT | Safe flight! | Launch an application conveying sentiment (see above) |
| +FLTI | Flight Information | Fetch and return updates on flight status based on airline and flight information in payload |
| +SONG | Get me a song | Return some song content to the sender based on the payload data |

Referring back to FIG. 1, communications network 20 may comprise any data and/or voice communications network. For example, communications network 20 may comprise all or some portion of any one or any combination of: a wired or wireless telephone network; a terrestrial telephone network; a satellite telephone network; an infrared network such as an Infrared Data Association (IrDA)-based network; a short-range wireless network; a Bluetooth® technology network; a ZigBee® protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.xx network; a packet data network; a data network; an Internet Protocol (IP) Multimedia Subsystem (IMS) network; a public switched telephone network; a public heterogeneous communications network, such as the Internet; a private communications network; a multicast network such as a Forward Link Only (FLO) network, including the MediaFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; and a land mobile radio network.

Further, examples of telephone networks that may be included in some aspects of communications network 20 include at least a portion of one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 5:
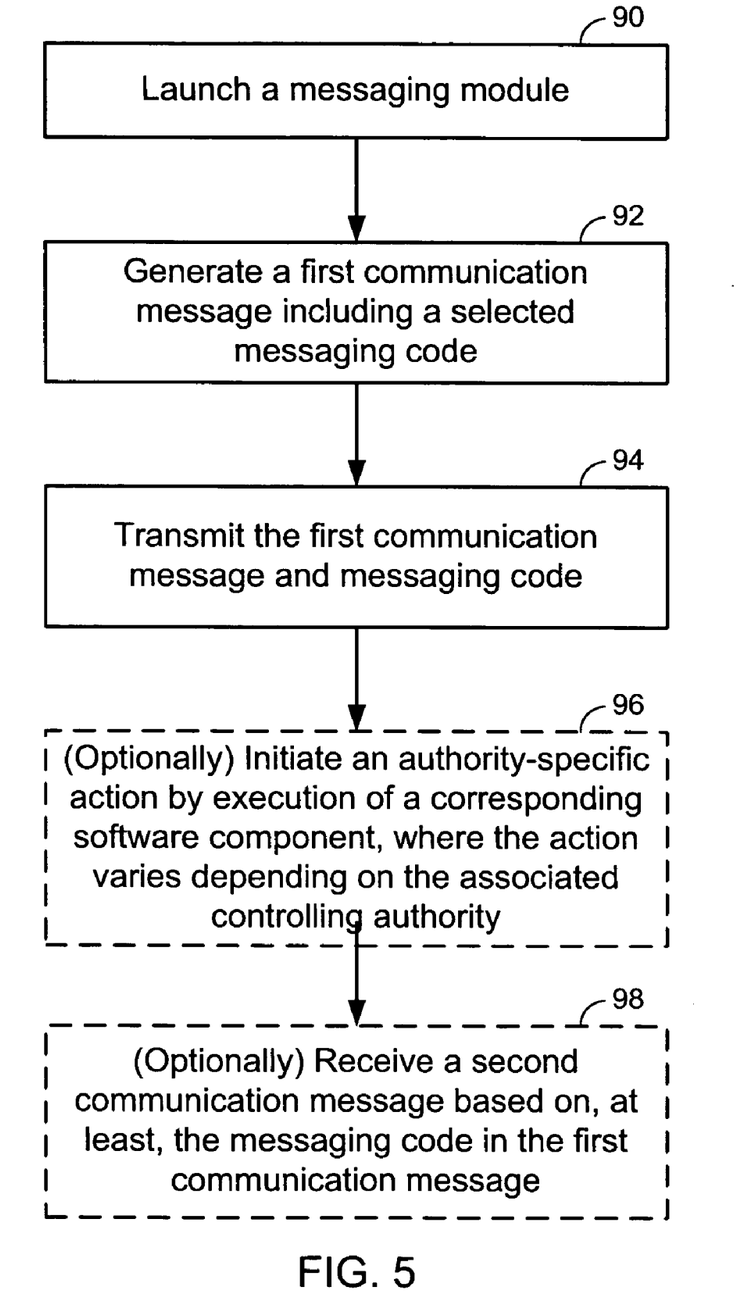
FIG. 5 is a flowchart of one aspect of a method for enhanced communications operable on a communication-originating device.

Referring to FIG. 5, in operation, one non-limiting case of a method for enhanced messaging at a sending communication device comprises launching a messaging module (Block 90). For example, in one non-limiting case, referring to FIGS. 1 and 2, communication device 12 may launch messaging module 32 which is stored in memory 46 and which is executable by processor 48.

The method may further include generating a communications message including a selected messaging code (Block 92). For example, in one non-limiting case, referring to FIGS. 1 and 2, communication device 12 may compose communications message 14 having messaging code 22. In some aspects, user interface module 82 may generate one or more menus to guide the user of device 12 through the process of generating communications message 14. Further, in some aspects, messaging module 32 and/or user interface module 82 may provide the user of device 12 with a list of available messaging codes 24, as well as the meaning and/or corresponding action, from which the user may select and thereby enter one or more messaging codes into communications message 14. Alternatively, the user may enter messaging code 22 into device 12, without selecting a presented code, through input mechanism 40. In some other alternative aspects, at least one code indicator 66 may be included in communications message 14 in combination with at least one messaging code 22.

Additionally, the method may include transmitting the communications message with the messaging code to another communication device (Block 94). For example, in one non-limiting case, referring to FIGS. 1 and 2, messaging module 32 may forward communications message 14 to communications module 54, which forwards communications message to communications network 20. It should be noted that in some aspects, messaging module 32 may forward portions of communications message 14 to communications module 54, and communications module 54 may construct communications message 14 based on the communication protocol in use by device 12 and then transmit communications message 14 to communication network 20. In transmitting communications message 14, device 12 initiates the operation of at least one of a plurality of authority-specific actions 26 on the receiving device, such as second communication device 16 and/or 18, based on each respective one of the plurality of messaging codes 24 included within communications message 14, thereby enhancing communications message 14 as well in some instances enhancing the exchange of future communications messages.

Optionally, the method may further include initiating an authority-specific action by execution of a corresponding software component, where the respective action varies depending on the controlling authority associated with the software component (Block 96). In one non-limiting case, for example, first communication device 12 includes a messaging module having a code detector operable to recognize messaging code 22 of communication message 14 and reference the code to one of a plurality of predetermined authority-specific actions to occur on first communication device 12. In particular, the corresponding authority-specific action is carried out by execution of a corresponding software component on first communication device 12, and the action varies depending on the respective one of the plurality of controlling authorities associated with the given software component.

Optionally, the method may further include receiving another communications message based on, at least, the messaging code in the transmitted communications message (Block 98). For example, in one non-limiting case, this received communications message may be a response to communications message 14 (FIG. 1), such as a return voice call, a return text message, fetched information from a server device based on the code and/or payload of communications message 14, etc.

Figure 6:
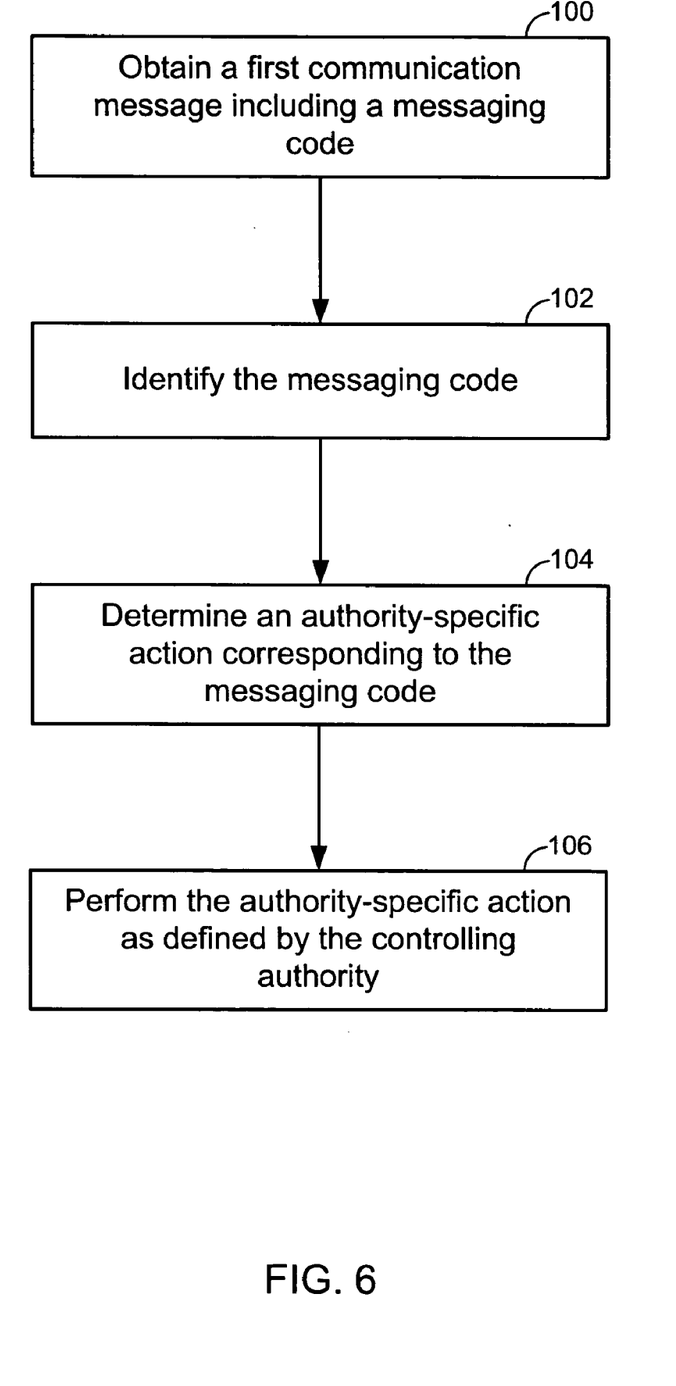
FIG. 6 is a flowchart of one aspect of a method for enhanced communications operable on a communication-receiving device.

Referring to FIG. 6, in operation, one non-limiting case of a method for enhanced messaging at a receiving communication device comprises obtaining a communications message having at least one messaging code (Block 100). For example, in one non-limiting case, referring to FIGS. 1 and 2, communication device 16 and/or 18 is in communication with communications network 20 and receives communications message 14 sent by communications device 12. In this case, communications message 14 may include at least one selected messaging code 22 entered by the user of device 12 into device 12 during the process of generating communications message 14. Further, messaging module 32 may be executable by communication device 16 and/or 18 to receive or access at least some portion of communications message 14.

Further, the method may include identifying the at least one messaging code associated with the communications message (Block 102). For example, in one non-limiting case, referring to FIGS. 1, 2 and 4, messaging module 32 may execute code detector 34 to determine the existence of selected messaging code 22 within communications message 14. For example, code detector 34 may determine if any portion of communications message 14 matches any of the plurality of messaging codes 24 known by code detector 34. Further, in some aspects, code detector 34 may execute code recognition logic 70, which may be operable to parse communications message 14 and identify one or more messaging codes. Additionally, in some alternate aspects, code detector 34 may identify code indicator 66 in communications message 14, thereby identifying that communications message 14 includes a messaging code and thereby initiating the search and recognition of one or more messaging codes 22.

Further, the method may include determining an authority-specific action corresponding to the at least one message code (Block 104). For example, in one non-limiting case, referring to FIGS. 1, 2 and 4, after matching selected messaging code 22 to one of the plurality of messaging codes 24, code detector 34 may associate selected messaging code 22 with a predetermined one of the plurality of authority-specific actions 26. Each of the plurality of authority-specific actions 26 is, in turn, associated with one of a plurality of software components 28. As such, any one of a plurality of controlling authorities 30 managing and/or providing the respective one of the plurality of software components 28 has the ability to control the corresponding authority-specific action. Thus, the respective authority-specific action corresponding to a given messaging code may vary depending on the associated controlling authority.

Further, for example, in some aspects, code detector 34 may execute action determination logic 74 to determine the authority-specific action corresponding to a detected messaging code. In some aspects, messaging module 32 may include messaging code index 76 to facilitate matching received messaging codes to known codes, and to further facilitate matching messaging codes to authority-specific actions and software components.

The method may further include performing the authority-specific action based on the messaging code (Block 106). In particular, the performance of the action is in accordance with the action defined by the respective controlling authority associated with the software component operable to perform the designated action. For example, in one non-limiting case, referring to FIGS. 1 and 2, messaging module 32 may initiate the execution of a selected one of the plurality of software components 28, where the selected software component is operable to carry out the identified authority-specific action corresponding to selected messaging code 22.

Thus, system 10 enhances messaging by providing communications message 14 having at least one messaging code 22, which can be input at a sending device, and which initiate a responsive, authority-specific action on a receiving device. As such, system improves the efficiency of message exchange by providing transport of additional information in a compact and simple manner, and by automatically initiating responsive actions based on the communications message and/or the messaging code.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or non-transitory computer readable medium.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of messaging, comprising:
obtaining, at a first communications device, a software component controlled by a controlling authority from among a plurality of controlling authorities, wherein the software component comprises a configuration for at least one authority specific action performed by the software component that varies depending on the respective one of the plurality of controlling authorities in control of the software component;

obtaining, at the first communications device, at least a portion of a communications message sent from a second communications device, wherein the portion of the communications message comprises at least one predetermined messaging code input into the second communications device during generation of the portion of the communications message, wherein the at least one predetermined messaging code is contained within the portion of the communications message, wherein the at least one predetermined messaging code comprises one of a plurality of messaging codes that define a messaging code language of a plurality of automatically initiated actions that are variable based on the respective one of the plurality of controlling authorities;

determining the at least one authority-specific action corresponding to the at least one predetermined messaging code, wherein the at least one authority-specific action is operable to be generated at least in part by the software component of the first communications device, wherein the controlling authority is different than the first and second communications devices, and wherein the configuration is different than the at least one predetermined messaging code; and performing the at least one authority-specific action automatically in response to obtaining at least the portion of the communications message and determining the at least one authority-specific action.

2. The method of claim 1, further comprising receiving the software component selected from a plurality of software components each having a different corresponding authority-specific action associated with the at least one predetermined messaging code.

3. The method of claim 1, wherein performing further comprises executing the software component to perform at least one of a plurality of predetermined functions, wherein each of the plurality of predetermined functions differs depending on the respective controlling authority associated with the respective software component.

4. The method of claim 1, wherein performing further comprises initiating a reply communications message to the second communications device based on at least one of a payload of the communications message and the at least one predetermined messaging code.

5. The method of claim 1, wherein performing further comprises generating an output on an output mechanism of the first communication device.

6. The method of claim 1, wherein determining further comprises identifying the at least one predetermined messaging code in the communications message and matching the at least one predetermined messaging code to one of a plurality of predetermined messaging codes.

7. The method of claim 1, wherein determining further comprises recognizing the at least one predetermined messaging code as one of a plurality of standardized messaging codes associated with respective ones of a plurality of authority-specific actions.

8. The method of claim 1, wherein determining further comprises identifying a code indicator associated with the at least one predetermined messaging code.

9. The method of claim 1, wherein determining further comprises defining the at least one predetermined messaging code based on at least one corresponding code indicator within the communications message.

10. The method of claim 1, wherein obtaining comprises receiving over a wireless communications network.

11. At least one processor configured to perform the actions of:

obtaining, at a first communications device, a software component controlled by a controlling authority from among a plurality of controlling authorities, wherein the software component comprises a configuration for at least one authority specific action performed by the software component that varies depending on the respective one of the plurality of controlling authorities in control of the software component;

obtaining, at the first communications device, at least a portion of a communications message sent from a second communications device, wherein the portion of the communications message comprises at least one predetermined messaging code input into the second communications device during generation of the portion of the communications message, wherein the at least one predetermined messaging code is contained within the portion of the communications message, wherein the at least one predetermined messaging code comprises one of a plurality of messaging codes that define a messaging code language of a plurality of automatically initiated actions that are variable based on the respective one of the plurality of controlling authorities;

determining the at least one authority-specific action corresponding to the at least one predetermined messaging code, wherein the at least one authority-specific action is operable to be generated at least in part by the software component of the first communications device, wherein the controlling authority is different than the first and second communications devices, and wherein the configuration is different than the at least one predetermined messaging code; and performing the at least one authority-specific action automatically in response to obtaining at least the portion of the communications message and determining the at least one authority-specific action.

12. A non-transitory computer readable medium comprising instructions stored thereon, comprising:

a first set of instructions for obtaining, at a first communications device, a software component controlled by a controlling authority from among a plurality of controlling authorities, wherein the software component comprises a configuration for at least one authority specific action performed by the software component that varies depending on the respective one of the plurality of controlling authorities in control of the software component;

a second set of instructions for obtaining, at a first communications device, at least a portion of the communications message sent from a second communications device, wherein the portion of the communications message comprises at least one predetermined messaging code input into the second communications device during generation of the portion of the communications message, wherein the at least one predetermined messaging code is contained within the portion of the communications message, wherein the at least one predetermined messaging code comprises one of a plurality of messaging codes that define a messaging code language of a plurality of automatically initiated actions that are variable based on the respective one of the plurality of controlling authorities;

the at least one authority-specific action corresponding to the at least one predetermined messaging code, wherein the at least one authority-specific action is operable to be generated at least in part by the software component of the first communications device, wherein the controlling authority is different than the first and second communications devices, and wherein the configuration is different than the at least one predetermined messaging code; and a fourth set of instructions for performing the at least one authority-specific action automatically in response to obtaining at least the portion of the communications message and determining the at least one authority-specific action.

13. A messaging apparatus, comprising:

means for obtaining, at a first communications device, a software component controlled by a controlling authority from among a plurality of controlling authorities, wherein the software component comprises a configuration for at least one authority specific action performed by the software component that varies depending on the respective one of the plurality of controlling authorities in control of the software component;

means for obtaining, at the first communications device, at least a portion of a communications message sent from a second communications device, wherein the portion of the communications message comprises at least one predetermined messaging code input into the second communications device during generation of the portion of the communications message, wherein the at least one predetermined messaging code is contained within the portion of the communications message, wherein the at least one predetermined messaging code comprises one of a plurality of messaging codes that define a messaging code language of a plurality of automatically initiated actions that are variable based on the respective one of the plurality of controlling authorities;

means for determining the at least one authority-specific action corresponding to the at least one predetermined messaging code, wherein the at least one authority-specific action is operable to be generated at least in part by the software component of the first communications device, wherein the controlling authority is different than the first and second communications devices, and wherein the configuration is different than the at least one predetermined messaging code; and means for performing the at least one authority-specific action automatically in response to obtaining at least the portion of the communications message and determining the at least one authority-specific action.

14. A communications device, comprising:

a processor;

a memory operable to store at least a portion of a messaging module and at least one software component; and a communications module operable to:

receive a software component controlled by a controlling authority from among a plurality of controlling authorities, wherein the software component comprises a configuration for at least one authority specific action performed by the software component that varies depending on the respective one of the plurality of controlling authorities in control of the software component;

receive at least a portion of a communications message sent from a second communications device, wherein the portion of the communications message comprises at least one predetermined messaging code input into the second communications device during generation of the portion of the communications message, wherein the at least one predetermined messaging code is contained within the portion of the communications message, wherein the at least one predetermined messaging code comprises one of a plurality of messaging codes that define a messaging code language of a plurality of automatically initiated actions that are variable based on the respective one of the plurality of controlling authorities;

wherein the messaging module is executable by the processor to determine the at least one authority-specific action corresponding to the at least one predetermined messaging code, wherein the at least one authority-specific action is operable to be automatically generated at least in part by the software component, wherein the controlling authority is different than the communications device and the other communications device, and wherein the configuration is different than the at least one predetermined messaging code.

15. The communications device of claim 14, wherein the software component is selected from a plurality of software components each having a different corresponding authority-specific action associated with the at least one predetermined messaging code.

16. The communications device of claim 14, wherein the software component is executable by the processor to perform at least one of a plurality of predetermined functions, wherein each of the plurality of predetermined functions differs depending on the respective controlling authority associated with the respective software component.

17. The communications device of claim 14, wherein the communications message further comprises a payload, and wherein the at least one authority-specific action comprises initiating a reply communications message to the second communication device based on at least one of the payload and the at least one predetermined messaging code.

18. The communications device of claim 14, wherein the communications device further comprises an output mechanism, and wherein the at least one authority-specific action comprises generating an output on the output mechanism.

19. The communications device of claim 14, wherein the memory further comprises a plurality of predetermined messaging codes each associated with a corresponding plurality of authority-specific actions, wherein the messaging module further comprises a code detector operable to identify the at least one predetermined messaging code in the communications message and match the at least one predetermined messaging code to one of the plurality of predetermined messaging codes.

20. The communications device of claim 14, wherein the messaging module further comprises a code detector operable to recognize the at least one predetermined messaging code as one of a plurality of standardized messaging codes associated with respective ones of a plurality of authority-specific actions.

21. The communications device of claim 14, wherein the communication message further comprises a code indicator associated with the at least one predetermined messaging code, and wherein the messaging module further comprises a code detector operable to identify the code indicator.

22. The communications device of claim 14, wherein the communication message further comprises at least one code indicator associated with the at least one predetermined messaging code, and wherein the messaging module further comprises a code detector operable to define the at least one predetermined messaging code based on at least one code indicator.

23. The communications device of claim 14, wherein the communications module is further operable to receive at least the portion of the communications message from a wireless communications network.

24. The communications device of claim 23, wherein the communications device comprises a cellular telephone.

25. A method of messaging, comprising:
generating a communications message comprising at least one predetermined messaging code selected from a plurality of messaging codes each associated with one of a plurality of authority-specific actions, wherein the at least one predetermined messaging code is contained within the communications message, wherein the plurality of messaging codes define a messaging code language of a plurality of automatically initiated actions that are variable based on a respective one of a plurality of controlling authorities, wherein the at least one predetermined messaging code is operable to automatically initiate execution of a corresponding software component on a communications device receiving the communications message, wherein the software component is controlled by a controlling authority of the respective one of the plurality of controlling authorities, wherein a configuration for at least one authority specific action performed by the software component varies depends on the respective one of the plurality of controlling authorities in control of the software component, wherein the at least one corresponding software component is operable to generate each respective one of the plurality of authority-specific actions associated with the at least one predetermined messaging code, wherein the plurality of controlling authorities are different than the receiving communications device, and wherein the configuration is different than the at least one predetermined messaging code; and
transmitting the communications message to another communications device.

26. The method of claim 25, wherein generating further comprises launching a messaging module, presenting a list of the plurality of messaging codes, and receiving a selection of the at least one predetermined messaging code.

27. The method of claim 25, wherein generating further comprises receiving at least one code indicator in association with the at least one messaging code.

28. The method of claim 25, wherein generating further comprises defining the at least one messaging code based on a position of at least one code indicator.

29. The method of claim 25, further comprising receiving a reply communications message based on the at least one predetermined messaging code in the communication message.

30. The method of claim 29, wherein receiving further comprises receiving a reply payload based on the at least one messaging code and a payload of the communications message.

31. The method of claim 25, further comprising:
locally detecting the at least one predetermined messaging code associated with the transmitted communications message;
determining a local authority-specific action associated with the at least one predetermined messaging code, wherein the local authority-specific action corresponds to a local software component under control of a respective one of the plurality of controlling authorities, wherein the at least one predetermined messaging code varies depending on the respective controlling authority associated with the local software component; and
locally-initiating the local authority-specific action.

32. At least one processor configured to perform the actions of:
generating a communications message comprising at least one predetermined messaging code selected from a plurality of messaging codes each associated with one of a plurality of authority-specific actions, wherein the at least one predetermined messaging code is contained within the communications message, wherein the plurality of messaging codes define a messaging code language of a plurality of automatically initiated actions that are variable based on a respective one of a plurality of controlling authorities, wherein the at least one predetermined messaging code is operable to automatically initiate execution of a corresponding software component on a communications device receiving the communications message, wherein the software component is controlled by a controlling authority of the respective one of the plurality of controlling authorities, wherein a configuration for at least one authority specific action performed by the software component varies depends on the respective one of the plurality of controlling authorities in control of the software component, wherein the at least one corresponding software component is operable to generate each respective one of the plurality of authority-specific actions associated with the at least one predetermined messaging code, wherein the plurality of controlling authorities are different than the receiving communications device, and wherein the configuration is different than the at least one predetermined messaging code; and
transmitting the communications message to another communications device.

33. A non-transitory computer readable medium comprising instructions stored thereon, comprising:
a first set of instructions for generating a communications message comprising at least one predetermined messaging code selected from a plurality of messaging codes each associated with one of a plurality of authority-specific actions that are variable based on a respective one of a plurality of controlling authorities, wherein the at least one predetermined messaging code is contained within the communications message, wherein the plurality of messaging codes define a messaging code language of a plurality of automatically initiated actions, wherein the at least one predetermined messaging code is operable to automatically initiate execution of a corresponding software component on a communications device receiving the communications message, wherein the software component is controlled by a controlling authority of the respective one of the plurality of controlling authorities, wherein a configuration for at least one authority specific action performed by the software component varies depends on the respective one of the plurality of controlling authorities in control of the software component, wherein the at least one corresponding software component is operable to generate each respective one of the plurality of authority-specific actions associated with the at least one predetermined messaging code, wherein the plurality of controlling authorities are different than the receiving communications device, and wherein the configuration is different than the at least one predetermined messaging code; and
a second set of instructions for transmitting the communications message to another communications device.

34. A messaging apparatus, comprising:
means for generating a communications message comprising at least one predetermined messaging code selected from a plurality of messaging codes each associated with one of a plurality of authority-specific actions that are variable based on a respective one of a plurality of controlling authorities, wherein the at least one predetermined messaging code is contained within the communications message, wherein the plurality of messaging codes that define a messaging code language of a plurality of automatically initiated actions, wherein the at least one predetermined messaging code is operable to automatically initiate execution of a corresponding software component on a communications device receiving the communications message, wherein the software component is controlled by a controlling authority of the respective one of the plurality of controlling authorities, wherein a configuration for at least one authority specific action performed by the software component varies depends on the respective one of the plurality of controlling authorities in control of the software component, wherein the at least one corresponding software component is operable to generate each respective one of the plurality of authority-specific actions associated with the at least one predetermined messaging code, wherein the plurality of controlling authorities are different than the receiving communications device, and wherein the configuration is different than the at least one predetermined messaging code; and means for transmitting the communications message to another communications device.

35. A communications device, comprising:

a processor;

a memory comprising a messaging module executable by the processor and operable to generate a communications message comprising at least one predetermined messaging code selected from a plurality of messaging codes each associated with one of a plurality of authority-specific actions that are variable based on a respective one of a plurality of controlling authorities, wherein the at least one predetermined messaging code is contained within the communications message, wherein the plurality of messaging codes define a messaging code language of a plurality of automatically initiated actions, wherein the at least one predetermined messaging code is operable to automatically initiate execution of a corresponding software component on a communications device receiving the communications message, wherein the software component is controlled by a controlling authority of the respective one of the plurality of controlling authorities, wherein a configuration for at least one authority specific action performed by the software component varies depends on the respective one of the plurality of controlling authorities in control of the software component, wherein the at least one corresponding software component is operable to generate each respective one of the plurality of authority-specific actions associated with the at least one predetermined messaging code, wherein the plurality of controlling authorities are different than the receiving communications device, and wherein the configuration is different than the at least one predetermined messaging code; and a communications module operable to transmit the communications message to another communications device.

36. The communications device of claim 35, further comprising an output mechanism and an input mechanism, wherein the messaging module is further operable to initiate a presentation of a list of the plurality of messaging codes on the output mechanism and wherein the messaging module is further operable to receive a selection of the at least one predetermined messaging code based on a user input at the input mechanism.

37. The communications device of claim 35, wherein the messaging module is further operable to generate at least one code indicator in association with the at least one messaging code in the communication message.

38. The communications device of claim 35, wherein the messaging module is further operable to define the at least one messaging code based on a position of at least one code indicator.

39. The communications device of claim 35, wherein at least one of the communications module and the messaging module is further operable to receive a reply communications message based on the messaging code in the communication message.

40. The communications device of claim 39, wherein at least one of the communications module and the messaging module is further operable to receive a reply payload based on the at least one predetermined messaging code and a payload of the communications message.

41. The communications device of claim 35, wherein the memory further comprises a plurality of local software components, wherein at least one of the plurality of local software components is operable to perform at least one of a plurality of local authority-specific actions, wherein the messaging module is further executable by the processor to determine at least one corresponding local authority-specific action from the plurality of local authority-specific action associated with the at least one predetermined messaging code, wherein the at least one corresponding local authority-specific action is operable to be generated at least in part by at least one local software component, wherein the at least one corresponding local authority-specific action is variable based on a respective controlling authority associated with the respective software component.

* * * * *